Sept. 2, 1969  R. P. HAWKINSON  3,464,873
METHOD OF TREADING PNEUMATIC TIRE CASINGS
Filed March 23, 1966  2 Sheets-Sheet 2
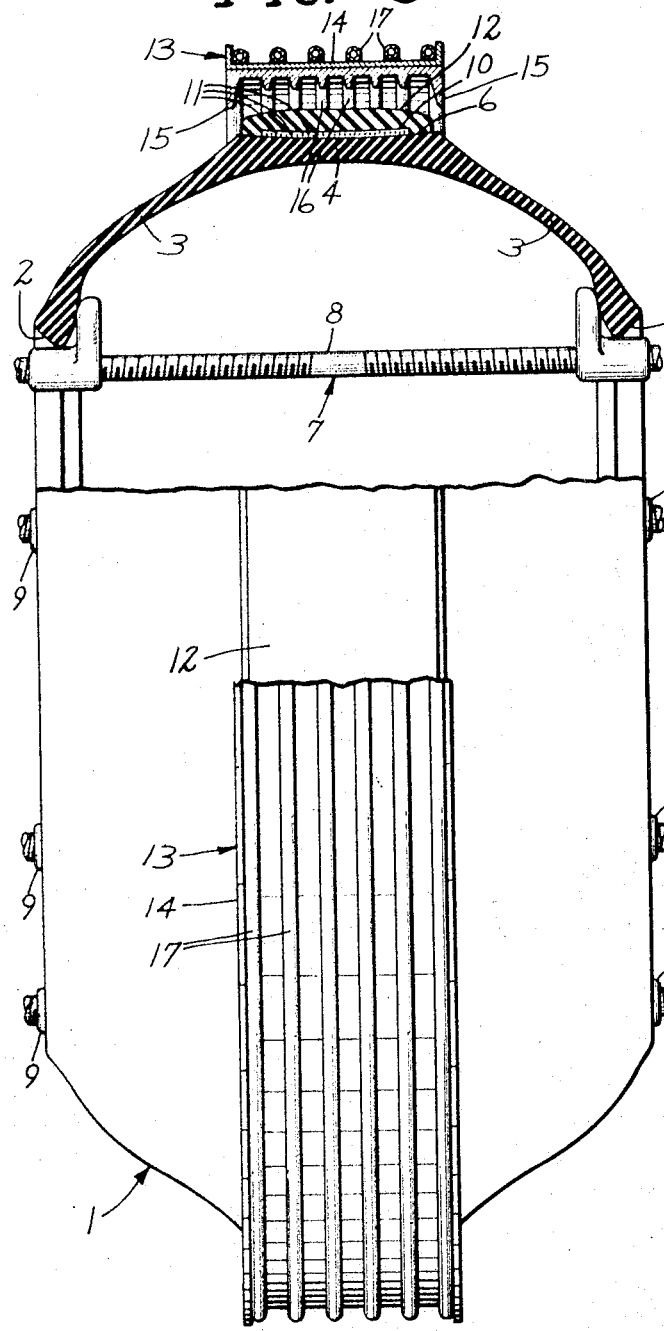
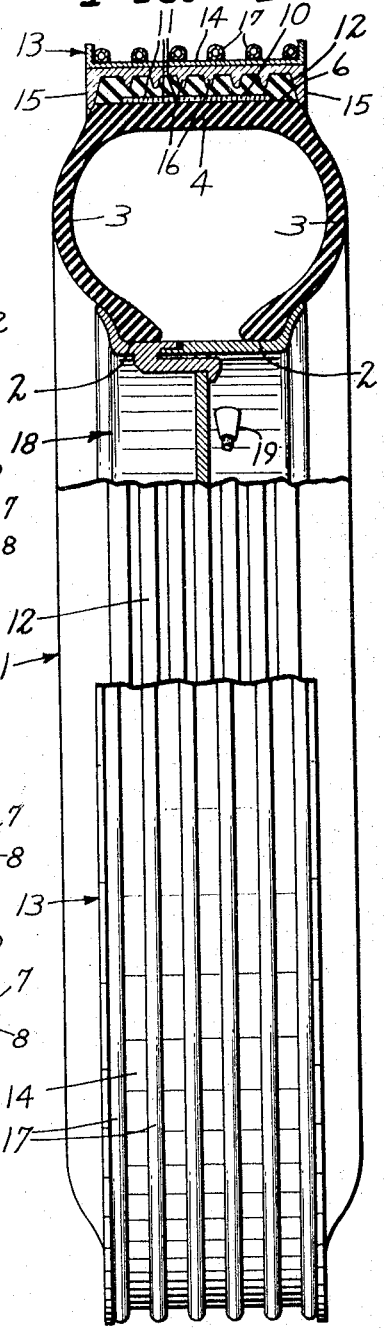
INVENTOR.
RAYMOND P. HAWKINSON
BY
Merchant & Gould
ATTORNEYS

# United States Patent Office 3,464,873
Patented Sept. 2, 1969

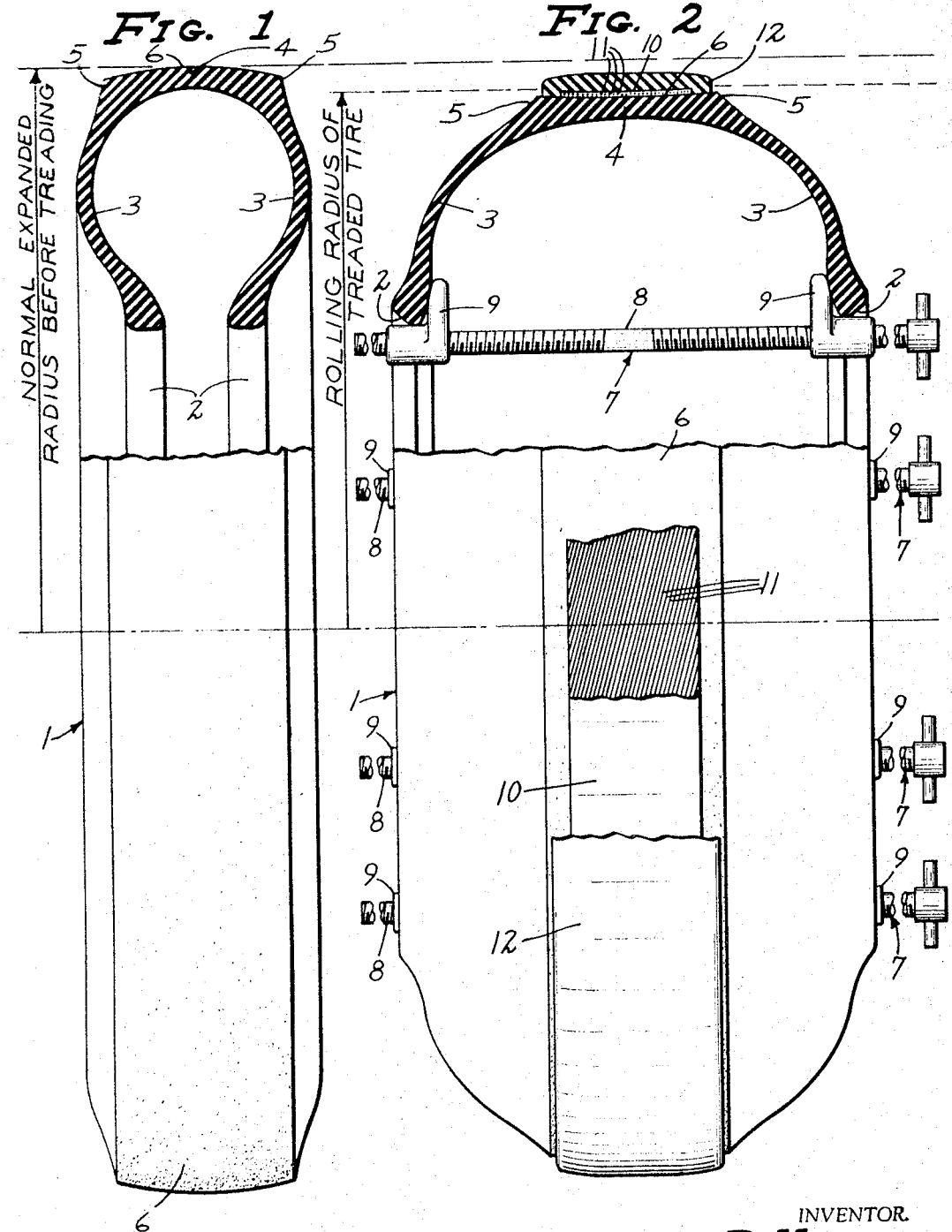

3,464,873
METHOD OF TREADING PNEUMATIC TIRE CASINGS
Raymond P. Hawkinson, Minneapolis, Minn., assignor to Paul E. Hawkinson Company, Minneapolis, Minn., a corporation of Minnesota
Filed Mar. 23, 1966, Ser. No. 536,707
Int. Cl. B29h 5/04, 17/37
U.S. Cl. 156—96
6 Claims

ABSTRACT OF THE DISCLOSURE

A method for treading a tire to provide a tire with the long wearing and easy handling qualities of a radial ply tire and the softer cushioning properties of a diagonal ply tire. The side wall portions of the tire are spread laterally to contract the crown portion to approximately the rolling radius and an annular flexible longitudinally substantially non-elastic reinforcing band is then applied over the crown. Tread material is applied over the band and crown and then cured.

---

This invention relates generally to pneumatic tires and more particularly to the art of producing tires of given characteristics and of retreading worn tires.

It is well known to those skilled in the art of pneumatic tire construction, that tires having fabric layers or plies the fabric cords of which extend diagonally across the tire from bead to bead thereof, and in which the cords of one fabric layer or ply extend diagonally in the opposite direction to those of an adjacent ply, provide a soft comfortable ride in the vehicle on which such tires are mounted. However, tires of this construction generate considerable heat due to relative movement between the layers or plies, particularly at higher road speeds, and tread life is unsatisfactory due to scuffing of the tread on the road surface as the tire endeavors to overcome the tread wave generated in the tread portion thereof as the tire rolls on the road surface.

In an effort to provide a cooler running and longer wearing tire having good handling characteristics, tires have been constructed having so-called radial plies in which the cords of the layers or plies extend radially from the beads and axially across the crown portion of the tire. Additionally, at least one producer of tires inserts a circumferential band of non-elastic metal mesh under the tread in the crown portion of the tire for greater protection against punctures and other road hazards. Such radial ply tires have been found not only to give substantially longer tread life, and to have improved handling characteristics, but also to generate substantially less heat than the above-described conventional or diagonal ply tires. However, the radial ply tires have been found to give much less cushioning effect on the vehicle, resulting in a considerably more harsh ride which is objectionable to many drivers.

An important object of this invention is the provision of a method for treading pneumatic tires which will provide a tire with the long-wearing and easy handling qualities of a radial ply tire and the softer cushioning properties of a diagonal ply tire.

Another object of this invention is the provision of a method of treading pneumatic tires which results in greatly added protection against punctures and other road hazards.

Another object of this invention is the provision of a method of treading pneumatic tires which results in a tire which is extremely stable during high rotational speeds, being held against centrifugally induced circumferential expansion.

Still another object of this invention is the provision of a method of treading pneumatic tires which can be easily practiced in the producing of new tires as well as in the retreading of worn tires.

To the above ends, I provide a method which comprises; first, in preparing the road-engaging crown surface of the tire, by roughening the surface and applying adhesive thereto, next, spreading the side walls of the tire apart to circumferentially reduce the crown portion of the tire to approximately the rolling radius thereof, adhering an annular flexible longitudinally substantially non-elastic reinforcing band to the crown surface of the tire in its reduced state, applying a layer of tread material to the reinforcing band and the crown surface of the tire adjacent the opposite side edges of the band, further spreading the side walls to further reduce the crown portion, as well as the band and layer of tread material to a radius substantially less than the rolling radius, and thereafter placing the tire in an annular curing matrix having a radius approximately equal to the rolling radius of the tire, removing the spreading pressure on the tire side walls, exerting radially outward pressure against the inner surface of the crown portion of the tire, and applying heat to the matrix to cure the tread material and reinforcing band to each other and to the tire.

The above, and still further important objects and advantages of this invention will become apparent from the following detailed specification, appended claims and attached drawings.

Referring to the drawings, which illustrate steps of the method of this invention, and in which like reference characters indicate like parts throughout the several views:

FIG. 1 is a view illustrating a worn or untreaded pneumatic tire in a shape normally assumed thereby, some parts of the tire being broken away and some parts being shown in transverse section;

FIG. 2 is a view similar to FIG. 1, but showing the beads and side walls of the tire as being laterally spread apart, so as to materially contract the road-engaging crown portion of the tire, and a reinforcing band and tread material applied to the contracted crown portion;

FIG. 3 is a view similar to FIG. 2, but showing the beads and side walls of the tire as being further spread apart, and the tire inserted in an annular treading matrix; and FIG. 4 is a view similar to FIG. 3, but showing the beads and side walls of the tire in a laterally contracted condition, a rim applied to the tire and the tire inflated within the matrix.

The present invention relates to the treading of tires by the "Hawkinson" system, as taught by the United States Reissue Patent No. 21,956, and U.S. Patents 2,282,578 and 2,282,579, these patents teaching the treading or retreading of pneumatic tires by curing the tread portion thereof to the tire casing in a matrix having a diameter less than the normal expanded diameter of the tire, the radius of the mold approximating the distance between the ground and the axis of the tire when the same is mounted on a vehicle and properly inflated. This shortened radius is known, and is hereby referred to, as the rolling radius of the tire.

For the purpose of the present example, the tire shown in the drawings is representative of an average pneumatic tire after it has been worn down to the point where it is ready for retreading. In FIG. 1, the tire 1 is illustrated in its normal substantially undistorted condition. The tire 1 comprises a pair of reinforced wheel rim engaging beads 2, relatively thin side walls 3, and a road-engaging crown portion 4 having relatively thick shoulder portions 5 at the opposite side edges thereof. Although not shown, it may be assumed that the tire 1 is of conventional structure, comprising two or more plies or layers of cords made from rayon, nylon or other suitable material, the cords of one ply or layer extending diagonally in one direction circumferentially of the tire from one of the beads 2 to the other thereof, the cords of the adjacent ply or plies extending diagonally in the opposite direction generally circumferentially of the tire.

The first step in carrying out my improved method is the abrading or buffing of the outer surface 6 of the crown portion 4 to clean and roughen the same to provide a good bonding surface. Preferably, this is done by rotating the tire on a fixed axis while a rotary rasp or buffing wheel is applied to the crown surface 6. Thereafter, the roughened crown surface 6 is given a coat of adhesive, such as rubber cement or the like.

The next step in carrying out my improved method is illustrated in FIG. 2 and consists in laterally spreading the beads 2 and adjacent side wall portions 3 to circumferentially contract the crown portion 4 of the tire to approximately the rolling radius of the tire. This may be accomplished on any conventional tire spreading equipment. For the sake of illustration, the spreading of the beads is shown in FIGS. 2 and 3 as being accomplished by a plurality of hand-operated spreaders 7 applied at circumferentially evenly spaced points about the beads 2 of the tire. The spreading devices 7 each comprise a handle-equipped stem 8 provided with left and right hand threads at their opposite end portions, and bead-engaging nut-acting spreader lugs 9 that are mounted on the opposite screw threaded end portions of the stem 8.

With the tire thus circumferentially contracted to approximately the rolling radius thereof, I adhere to the crown surface 6 an annular band 10 of flexible material which is non-elastic in a direction circumferentially of the tire. The band 10 may be of any suitable material but, for the purpose of the present example, is preferably made from a plurality of cords 11 of glass fibers or other non-elastic material, embedded in rubber. Preferably, and as shown in FIG. 2, the glass cords 11 are disposed to extend substantially circumferentially of the tire 1, or at an angle to the circumferential dimension of the tire, not to exceed approximately 15°. The band 10 may be applied to the tire in one or two layers as desired. If but one layer is used, it is desirable that the band 10 be of sufficient length that the ends thereof, not shown, overlap slightly. If two layers are used, it is desirable that the glass cords 11 of one thereof are angularly disposed with respect to the cords 11 of the other thereof. As shown in FIG. 2, the reinforcing band 10 is of less width than the width of the crown surface 6, so as to leave portions of the crown surface 6 outwardly of the opposite side edges of the band 10 exposed.

The next step in carrying out the present method is to apply a band 12 of tread material, such as rubber, to the band 10 and exposed portions of the crown surface 6, while the tire 1 is in its contracted condition, illustrated in FIG. 2. The annular band of new tread material 12 is usually uncured tread stock, and this is rolled or stitched to the band 10 and crown surface 6 to provide a tight bond therebetween.

Next, the spreading devices 7 are manipulated to further spread the beads 2 and side walls 3 apart to further reduce the circumference of the circle defined by the tread material 12 on the tire 1, so that the tire may be placed in an annular curing matrix 13, as shown in FIG. 3. Preferably, and as shown, the matrix 13 is of the type commonly used in the Hawkinson system, and comprises an annular band 14 having radially inwardly projecting annular confining flanges 15 at its opposite side edges, and radially inwardly projecting design forming flanges or elements 16 intermediate the confining flanges 15. Means for heating the matrix 13 comprises an elongated tube or the like 17 coiled around the outer surface of the band or body 14, and adapted to carry live steam or other suitable heating medium in the manner disclosed in the earlier Hawkinson Reissue Patent No. 21,956. The maximum radius of the inner surface of the band 14 is approximately equal to the rolling radius of the tire, preferably being slightly greater than the rolling radius.

It will be noted that, when the tire 1 is circumferentially reduced to a point where it can be inserted in the mold, as shown in FIG. 3, the non-elastic qualities of the reinforcing band 10 will cause the crown portion 4 of the tire to buckle inwardly at one or more circumferentially spaced points about the tire 1. Normally, buckling will occur at portions of the tire radially outwardly of each of the spreading devices 7, inasmuch as it is at these points that the greatest spreading of the beads 2 and side walls 3 occurs.

When the tire is placed within the mold, as shown in FIG. 3, the spreading devices 7 are manipulated to permit the beads 2 and side walls 3 to contract in a direction axially of the tire, toward their normal positions shown in FIG. 1, after which the spreading devices 7 are removed. Lateral contraction of the beads 2 and side walls 3, permits the tire 1 to radially expand within the matrix 13, this expansion causing the tread layer 12 to be received within confining flanges 15 and to be pressed against the inner surface of the treading band 14. As the tire expands toward engagement of the tread layer with the matrix 13, the buckled portions thereof, not shown, disappear, and the tread layer 12 engages the inner surface of the matrix 13 throughout the circumference of the tire 1.

After the spreading devices 7 are removed, a suitable annular rim 18 is applied to the bead portions of the tire, and air under pressure is introduced to the interior of the tire 1 through a conventional valve 19, to press the crown portion 4 of the tire radially outwardly toward the matrix 13. The matrix 13 is then heated to the proper temperature and for a length of time sufficient to cure the thread material and reinforcing band to the crown portion 4 of the tire 1. When the curing is completed, the matrix 13 is cooled, the rim 18 removed. Spreading devices are again applied to the beads 2 and the threaded tire circumferentially reduced sufficiently to permit withdrawal thereof axially from the matrix 13.

When the threaded tire is mounted on the rim of a vehicle wheel, the non-elastic band 10 will prevent the tire from assuming a radially expanded shape, such as shown in FIG. 1, but will cause the tire to have the appearance of a so-called "low profile" tire of present day manufacture. By thus holding the outer surface of the treaded tire to approximately the rolling radius thereof, the tread material is in a substantially neutral condition where it engages the crown, thus minimizing the building up of a tread wave in the tire as it rotates over the ground. Hence, very little, if any, scuffing of the tread material occurs during its contact with the road, resulting in substantially longer tread life than formerly. Further, by using a tire having diagonal ply side walls, as above set forth, and a non-elastic band 10, a softer and more comfortable ride is obtained than has been heretofore experienced with radial ply tires. Still further, the neutral condition of the tread material on the road contributes materially to the ease of handling and control of the vehicle on the highway.

While the method of this invention has been described above in connection with the retreading of worn tires, it will be appreciated that the method can be, and is intended to be, used in the manufacture of new tires. In the manufacture of a new tire, the same will be produced in the conventional manner but without including the tread layer, producing a tire which resembles a worn tire, much as shown in FIG. 1. The new tire is then finished in the manner above described relative to worn tires.

While I have shown and described a preferred method of treading tires, it will be understood that the same is capable of modification without departure from the spirit and scope of the invention, as defined in the claims.

What is claimed is:
1. The method of treading a pneumatic tire having a fully vulcanized diagonal ply carcass of high profile type, said method comprising:
   (a) laterally spreading the side wall portions of said tire to circumferentially contract the crown portion of the tire to approximately the rolling radius thereof,
   (b) applying an annular flexible longitudinally substantially non-elastic reinforcing band over the crown portion of said tire to closely encompass said crown portion,
   (c) applying tread material to said band and crown portion of the tire,
   (d) spreading said walls further to further reduce the crown portion, band and tread material to a radius less than said rolling radius,
   (e) placing the tire in an annular treading matrix having a radius approximately equal to said rolling radius, and radially expanding the tire therein by exerting radially outward pressure against the interior of said crown portion of the tire,
   (f) and thereafter curing said tread material to said tire crown portion within said matrix, whereby the outer surface of the treaded tire is held to approximately the rolling radius to define a tire having a low profile.

2. The method of treading a pneumatic tire, having a fully vulcanized diagonal ply carcass of high profile type, said method comprising:
   (a) abrading the crown surface portion of a tire to provide a roughened surface, and coating the roughened surface with adhesive,
   (b) laterally spreading the side wall portions of the tire to circumferentially contract the crown portion of the tire to approximately the rolling radius thereof,
   (c) adhering an annular flexible longitudinally substantially non-elastic reinforcing band to the crown surface of the tire,
   (d) adhering a band of tread material to said reinforcing band and to said crown surface portion of the tire,
   (e) laterally spreading the side wall portions of the tire further to further reduce the tire crown portion, reinforcing band and tread material to a radius less than said rolling radius,
   (f) placing the tire in an annular treading matrix having a radius approximately equal to said rolling radius, and radially expanding the tire therein by exerting radially outward pressure against the interior of said crown portion of the tire,
   (g) and thereafter curing said tread material to said tire crown portion within said matrix whereby the outer surface of the treaded tire is held to approximately the rolling radius to define a tire having a smaller radius and greater width than the tire before treading.

3. The method of treading a pneumatic tire having a fully vulcanized diagonal ply carcass of high profile type, said method comprising:
   (a) laterally spreading the side wall portions of the tire to circumferentially contract the crown portion of the tire to approximately the rolling radius thereof,
   (b) adhering an annular flexible longitudinally substantially non-elastic reinforcing band of less width than that of said crown portion to the crown portion intermediate the side edges thereof,
   (c) adhering a strip of tread material of greater width than said reinforcing band to said band and said tire crown portion adjacent opposite side edges of the reinforcing band, about the circumference of said tire,
   (d) spreading said side walls further to further reduce the tire crown portion, band and tread material to a radius less than said rolling radius,
   (e) placing the tire in an annular treading matrix having a radius approximately equal to said rolling radius, and radially expanding the tire therein by laterally contracting the tire side walls and by exerting radially outward pressure against the interior of said crown portion of the tire,
   (f) and thereafter curing said tread material to said tire crown portion within said matrix, whereby the outer surface of the treaded tire is held to approximately the rolling radius and the carcass is retained under stress by the reinforcing band to define a tire having a smaller radius and greater width than the tire before treading.

4. The method defined in claim 3 including the step of first abrading the crown surface of the tire and applying adhesive to the abraded surface.

5. The method defined in claim 1 including the application of heat to said matrix to cure the tread material on said tire.

6. The method defined in claim 1 including the further step of spreading the side walls of the tire to remove the same from said matrix.

References Cited

UNITED STATES PATENTS

| 2,282,578 | 5/1942 | Hawkinson | 156—96 |
| 2,292,286 | 8/1942 | Owen | 156—96 |
| 2,982,328 | 5/1961 | Emannelli et al. | 152—361 |
| 3,294,143 | 12/1966 | Frazier | 152—361 |

FOREIGN PATENTS 1,171,333  10/1958  France.

HAROLD ANSHER, Primary Examiner

C. B. COSBY, Assistant Examiner

U.S. Cl. X.R.

18—18; 156—126, 128